United States Patent
Liu

(10) Patent No.: US 12,481,213 B2
(45) Date of Patent: Nov. 25, 2025

(54) MASK CORNER ROUNDING EFFECTS IN THREE-DIMENSIONAL MASK SIMULATIONS USING FEATURE IMAGES

(71) Applicant: Synopsys, Inc., Mountain View, CA (US)

(72) Inventor: Peng Liu, Cupertino, CA (US)

(73) Assignee: Synopsys, Inc., Sunnyvale, CA (US)

( * ) Notice: Subject to any disclaimer, the term of this patent is extended or adjusted under 35 U.S.C. 154(b) by 655 days.

(21) Appl. No.: 17/897,529

(22) Filed: Aug. 29, 2022

(65) Prior Publication Data

US 2023/0079453 A1  Mar. 16, 2023

Related U.S. Application Data

(60) Provisional application No. 63/240,039, filed on Sep. 2, 2021.

(51) Int. Cl.
*G03F 1/70* (2012.01)
*G03F 7/00* (2006.01)

(52) U.S. Cl.
CPC .......... *G03F 1/70* (2013.01); *G03F 7/70283* (2013.01); *G03F 7/705* (2013.01)

(58) Field of Classification Search
USPC ......................................................... 716/55
See application file for complete search history.

(56) References Cited

U.S. PATENT DOCUMENTS

| | | |
|---|---|---|
| 7,587,704 B2 | 9/2009 | Ye et al. |
| 7,703,069 B1 | 4/2010 | Liu et al. |
| | (Continued) | |

FOREIGN PATENT DOCUMENTS

| | | |
|---|---|---|
| EP | 1465016 A2 | 10/2004 |
| JP | 2009-204823 A | 9/2009 |
| | (Continued) | |

OTHER PUBLICATIONS

Liu, P. "Accurate Prediction of 3D Mask Topography Induced Best Focus Variation in Full-Chip Photolithography Applications." Proceedings of SPIE, Photomask Technology, vol. 8166, Oct. 13, 2011, pp. 1-8.

(Continued)

*Primary Examiner* — Mohammed Alam
(74) *Attorney, Agent, or Firm* — Fenwick & West LLP

(57) ABSTRACT

A layout geometry of a lithographic mask is received. The layout geometry includes at least one shape having one or more rounded corners. The layout geometry is partitioned into a plurality of feature images, for example as selected from a library. The feature images include at least one mask corner rounding (MCR)-corrected feature image that accounts for the rounded corners of the shape. The feature images have corresponding mask 3D (M3D) filters, which represent the electromagnetic scattering effect of that feature image for a given source illumination. The mask function contribution from each of the feature images is calculated by convolving the feature image with its corresponding M3D filter. The mask function contributions are combined to determine a mask function for the mask illuminated by the source illumination.

15 Claims, 15 Drawing Sheets
(3 of 15 Drawing Sheet(s) Filed in Color)

(56) References Cited

U.S. PATENT DOCUMENTS

| | | | |
|---|---|---|---|
| 8,938,696 | B1 | 1/2015 | Torunoglu et al. |
| 10,451,563 | B2 | 10/2019 | Sousa et al. |
| 2014/0195993 | A1* | 7/2014 | Liu .......................... G03F 1/36 716/51 |
| 2015/0378264 | A1 | 12/2015 | Liu |
| 2017/0147734 | A1 | 5/2017 | Rosenbluth |
| 2020/0004161 | A1 | 1/2020 | Yu et al. |
| 2020/0380362 | A1* | 12/2020 | Cao .......................... G06N 3/04 |
| 2021/0064811 | A1* | 3/2021 | Liu .......................... G06F 30/20 |
| 2021/0397080 | A1 | 12/2021 | Yeo |

FOREIGN PATENT DOCUMENTS

| | | |
|---|---|---|
| JP | 2010-176144 A | 8/2010 |
| JP | 2015-513208 A | 4/2015 |
| JP | 2016-507786 A | 3/2016 |
| KR | 10-2014-0101814 A | 8/2014 |
| KR | 10-2015-0124967 A | 11/2015 |
| TW | 201921095 A | 6/2019 |
| WO | WO 2013/079316 A2 | 6/2013 |
| WO | WO 2014/127985 A1 | 8/2014 |
| WO | WO 2019/162346 A1 | 8/2019 |
| WO | WO 2021/091838 A1 | 5/2021 |

OTHER PUBLICATIONS

Liu, P. et al. "Fast 3D Thick Mask Model for Full-Chip EUVL Simulations." Proceedings of SPIE, Extreme Ultraviolet (EUV) Lithography IV, vol. 8679, Apr. 1, 2013, pp. 1-16.
Liu, P. et al. "Fast and Accurate 3D Mask Model for Full-Chip OPC and Verification." Proceedings of SPIE, vol. 6520, Mar. 26, 2007, pp. 1-12.
PCT International Search Report and Written Opinion, PCT Application No. PCT/US2021/048761, Dec. 22, 2021, 11 pages.
PCT International Search Report and Written Opinion, PCT Application No. PCT/US2022/045380, Feb. 6, 2023, 13 pages.
Zhang, H. et al. "An Accurate ILT-Enabling Full-Chip Mask 3D Model for All-Angle Patterns." SPIE Photomask Technology, vol. 8880, Sep. 9, 2013, pp. 1-10.
Japan Patent Office, Office Action, Japanese Patent Application No. 2023-517378, Feb. 17, 2025, nine pages.
Taiwan Intellectual Property Office, Office Action, Taiwanese Patent Application No. 110134568, Jun. 6, 2025, 22 pages.

* cited by examiner

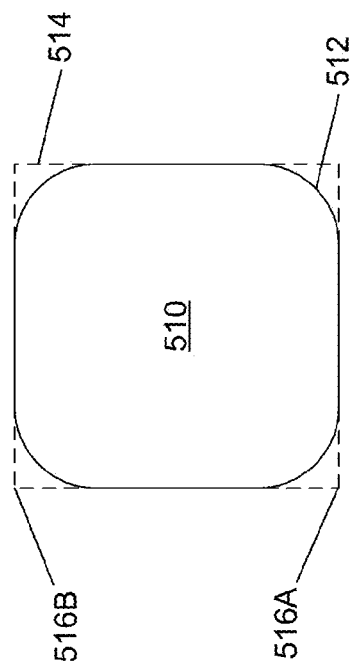
FIG. 5A
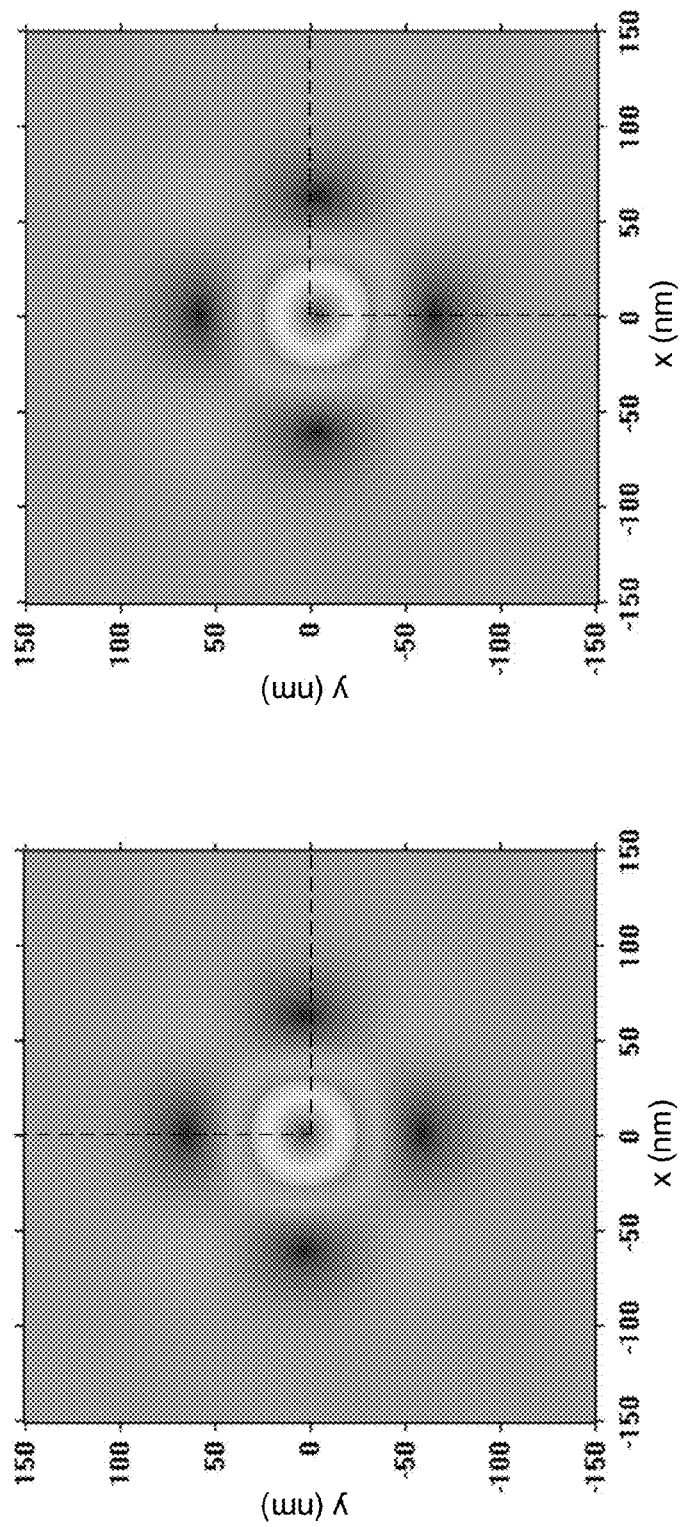
FIG. 5B
FIG. 5C

MASK CORNER ROUNDING EFFECTS IN THREE-DIMENSIONAL MASK SIMULATIONS USING FEATURE IMAGES

RELATED APPLICATION

This application claims priority under 35 U.S.C. § 119(e) to U.S. Provisional Patent Application Ser. No. 63/240,039, "Mask Corner Rounding Effects in Lithography Simulations," filed Sep. 2, 2021. The subject matter of all of the foregoing is incorporated herein by reference in its entirety.

TECHNICAL FIELD

The present disclosure relates to lithographic mask simulations, including for full-chip or large-scale computational lithography applications.

BACKGROUND

One step in the manufacture of semiconductor wafers involves lithography. In a typical lithography process, a source produces light that is collected and directed by collection/illumination optics to illuminate a lithographic mask. Projection optics relay the pattern produced by the illuminated mask onto a wafer, exposing resist on the wafer according to the illumination pattern. The patterned resist is then used in a process to fabricate structures on the wafer.

Various technologies are directed to improving the lithography process, including the design of the lithographic mask. In computational lithography, the lithographic mask design is used as an input to a three-dimensional mask model, which is used to compute a mask function that describes the electromagnetic field scattering characteristics of the mask illuminated by the light source. The mask function may then be used as input to an optical imaging model (e.g., Abbe imaging model or Hopkins imaging model) to predict the printed pattern in resist. It is important that the three-dimensional mask model is accurate as well as fast.

A semiconductor device design often contains patterns of sharp corners. However, due to limitations of mask making processes, these corners are often rounded in the actual lithographic masks, and rounded corners can have different lithographic effects as compared to sharp corners.

SUMMARY

In one aspect, a layout geometry of a lithographic mask is received. The layout geometry includes at least one shape having one or more rounded corners. The layout geometry is partitioned into a plurality of feature images, for example as selected from a library. The feature images include at least one mask corner rounding (MCR)-corrected feature image that accounts for the rounded corners of the shape. The feature images have corresponding mask 3D (M3D) filters, which represent the electromagnetic scattering effect of that feature image for a given source illumination. The mask function contribution from each of the feature images is calculated by convolving the feature image with its corresponding M3D filter. The mask function contributions are combined to determine a mask function for the mask illuminated by the source illumination.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5A depicts a mask structure with rounded corners.

FIGS. 5B and 5C depict mask corner rounding (MCR) correction images for the mask structure of FIG. 5A.

DETAILED DESCRIPTION

Figure 1A:
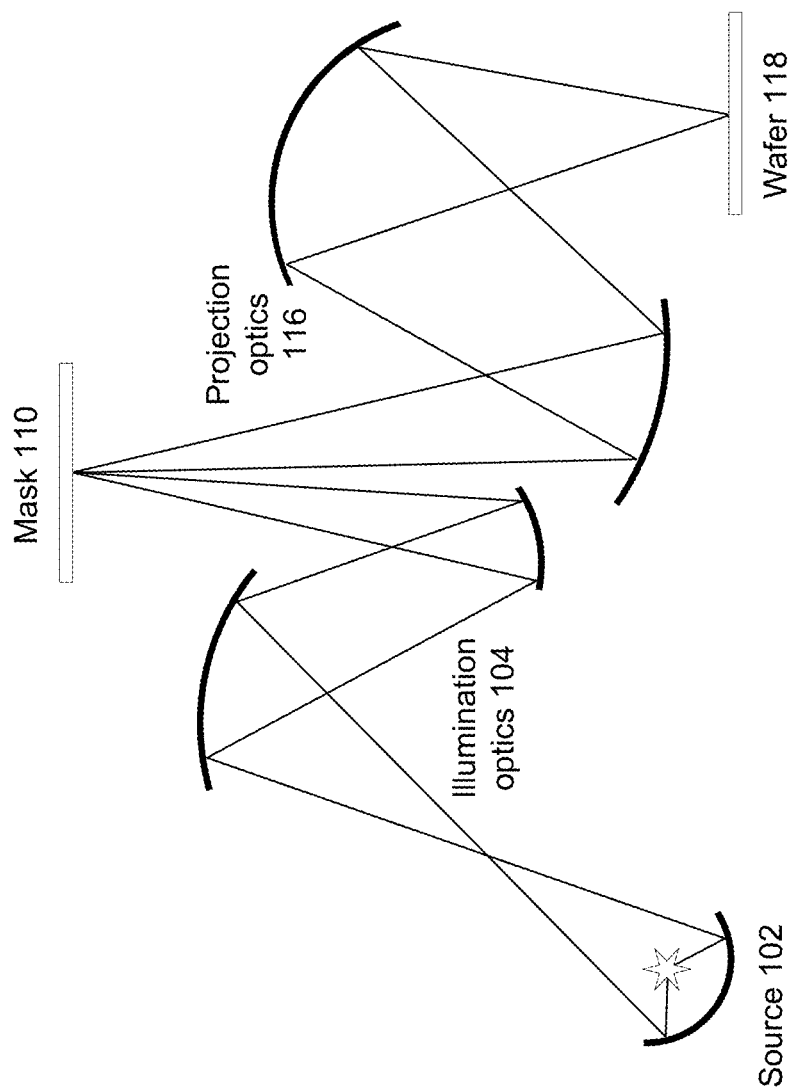
FIG. 1A depicts an extreme ultraviolet (EUV) lithography process suitable for use with embodiments of the present disclosure.

Aspects of the present disclosure relate to three-dimensional mask simulations based on feature images. The illumination pattern that exposes resist on a wafer depends on the geometric layout of the lithographic mask and the source illumination, among other factors. Simulation of the lithographic process depends on an accurate prediction of the electromagnetic field produced by the source illumination incident on the lithographic mask. This field may be predicted using rigorous, three-dimensional simulations of Maxwell's equations, accounting for diffraction and scattering effects. However, such simulations are computationally intensive and have long run times. As a result, in many cases, it is prohibitive to run rigorous three-dimensional simulations for the mask area covering an entire chip.

Aspects of the present disclosure relate to calculating the electromagnetic field diffraction and scattering characteristics, as represented by a mask function (MF), by using a set of feature images (a.k.a. feature vectors) and corresponding filters (referred to as mask 3D or M3D filters). The feature images represent basic geometries that may be present in the mask, and the corresponding M3D filters represent the scattering effects resulting from the feature images. The M3D filters may be determined based on rigorous electromagnetic simulation of the scattering effects of the feature images given the source illumination.

In one approach, the features images are selected from a library of predefined feature images and their corresponding precalculated mask 3D (M3D) filters. The feature images in the library include, but are not limited to, the following:
- 0-edge feature images: bulk area (no edges)
- 1-edge feature images: edges of different orientations
- 2-edge feature images: combinations of two edges with different orientations and spatial relations relative to each other
- 3+ edge feature images: combinations of three or more edges (e.g., polygon shapes)

In many cases, the actual layout geometry of the lithographic mask will include shapes with rounded corners rather than sharp corners. Certain approaches for modeling mask corner rounding (MCR) effects involve a process of generating new layout geometries with rounded corners or approximations of rounded corners based on the original layout with sharp corners. The new layouts are then passed on to the subsequent simulation flow. However, these approaches may be too simplistic to accurately capture the corner rounding behavior of complex shapes, e.g., shapes having arbitrary edge angles, small jogs or segments, etc. In addition, such approaches may create mask layouts with too many extra vertices compared to the original layout, for example if rounded corners are approximated by Manhattan geometries. This in turn increases the runtime of the subsequent simulation flow.

In additional aspects of the disclosure, the MCR effects of various mask features are pre-computed and saved as lookup tables (LUT) or other data structures. These LUTs are re-used in 3D mask simulations to add the MCR effects to the 3D mask fields. The electromagnetic field diffraction and scattering characteristics, as represented by a mask function (MF), are calculated by using a set of feature images and corresponding M3D filters based on the mask layout without corner rounding. These feature images, which will be referred to as polygon-based feature images, are then modified according to the precomputed MCR effects. The modified feature images, which will be referred to as MCR-corrected feature images, rather than the unmodified polygon-based feature images, are convolved with the M3D filters to calculate the mask function for the layout with rounded corners.

This approach does not create additional layouts or vertices for the subsequent simulation flow to process and therefore improves simulation runtime compared to alternative approaches. In addition, the MCR corrections may be precomputed and saved as lookup tables. The MCR corrections may also be parameterized, for example as a function of the corner angle and the curvature of the rounded corner.

Additional advantages of the present disclosure include, but are not limited to, the following. It may be more suitable for use with both machine learning (ML) and non-ML frameworks as well as for graphics processing units (GPU). Compared to the full rigorous simulation, the approach is more computationally efficient for model creation, training and calibration and runtime is also reduced, while still producing accurate results for the mask function. The resulting mask function may also be used efficiently in both Hopkins and Abbe imaging models, which may be the next steps in the lithography simulation.

In more detail, FIG. 1A depicts an EUV lithography process suitable for use with embodiments of the present disclosure. In this system, a source 102 produces EUV light that is collected and directed by collection/illumination optics 104 to illuminate a mask 110. Projection optics 116 relay the pattern produced by the illuminated mask onto a wafer 118, exposing resist on the wafer according to the illumination pattern. The exposed resist is then developed, producing patterned resist on the wafer. This is used to fabricate structures on the wafer, for example through deposition, doping, etching or other processes.

In FIG. 1A, the light is in the EUV wavelength range, around 13.5 nm or in the range 13.3-13.7 nm. At these wavelengths, the components typically are reflective, rather than transmissive. The mask 110 is a reflective mask and the optics 104, 116 are also reflective and off-axis. This is just an example. Other types of lithography systems may also be used, including at other wavelengths including deep ultraviolet (DUV), using transmissive masks and/or optics, and using positive or negative resist.

Figure 1B:
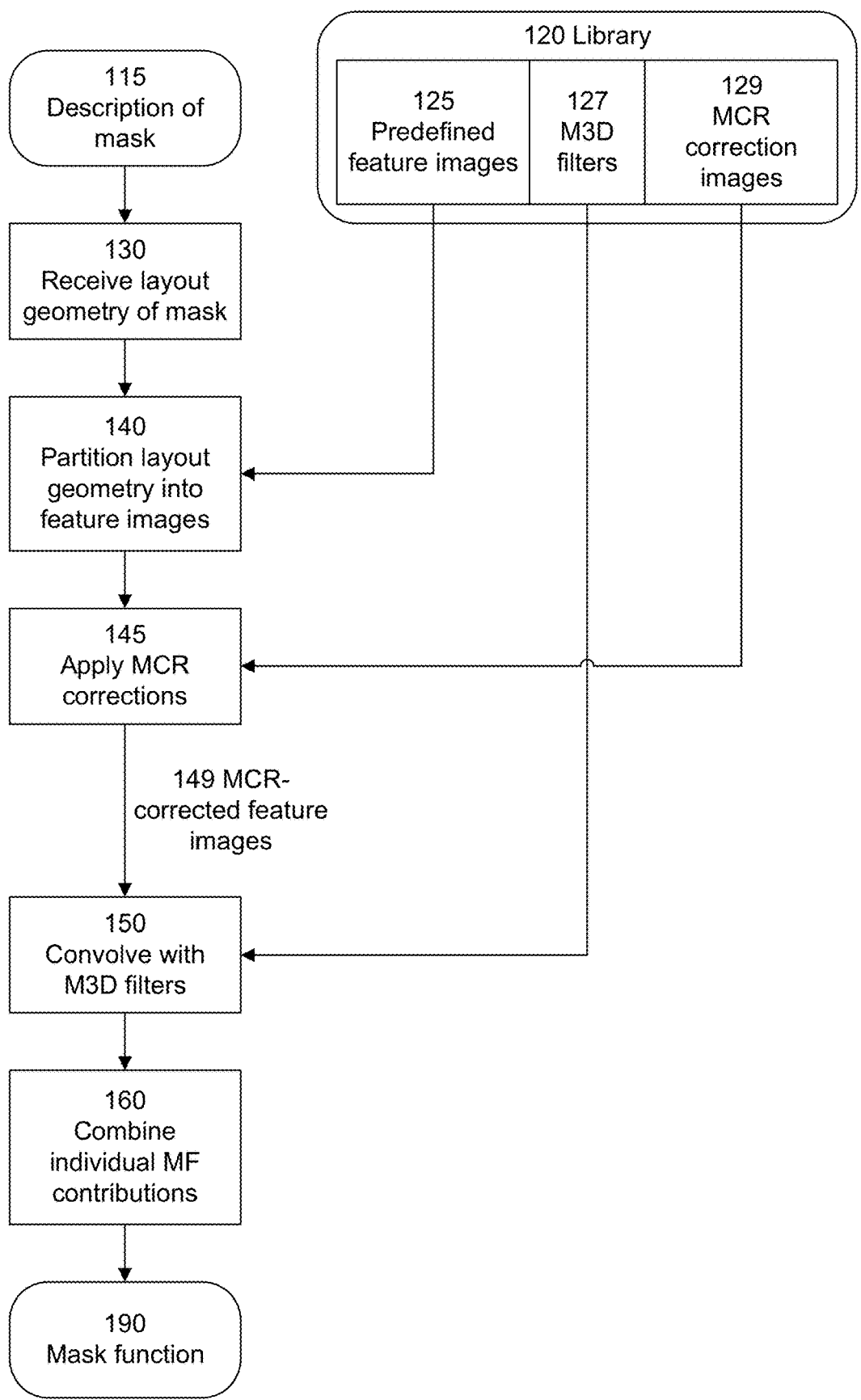
FIG. 1B is a flowchart for calculating scattering from a mask.

FIG. 1B is a flowchart for calculating scattering from a mask 110. The diffraction and scattering from the mask 110 is represented by a mask function (MF) 190. The process of FIG. 1B uses a description 115 of the mask and a library 120 to calculate the mask function 190 for the mask. The library contains predefined features images 125 and corresponding filters 127, which will be referred to as mask 3D (M3D) filters because they represent the contribution to the overall mask function from that type of feature image for a given source illumination. The M3D filters 127 include effects of the source illumination. The feature images 125 and M3D filters 127 assume sharp corners. The library 120 also includes MCR correction images 129, which are modifications of the feature images 125 to correct for mask corner rounding.

As shown in FIG. 1B, the layout geometry of the mask is received 130 and partitioned 140 into predefined feature images 125. For shapes with rounded corners, these feature images are corrected 145 according to the relevant MCR correction image 129. The resulting feature images will be referred to as MCR-corrected feature images 149. The mask function (MF) contribution from each feature image is calculated by convolving 150 the MCR-corrected feature image 149 with the corresponding M3D filter 127. Note that the M3D filter 127 is not changed. The aggregate mask function for the mask and given source illumination is determined by combining (e.g., summing) 160 the MF contributions from the individual feature images.

In FIG. 1B, the MCR-corrected feature images 149 are generated by starting with polygon-based feature images 125 from the library 120 (i.e., feature images based on sharp corners) and then applying the MCR correction images 129. Alternatively, feature images that account for rounded corners may also be precomputed and stored in library 120, in which case the MCR-corrected feature images 149 may be generated by retrieving the applicable MCR-corrected feature image from library 120.

Figure 2:
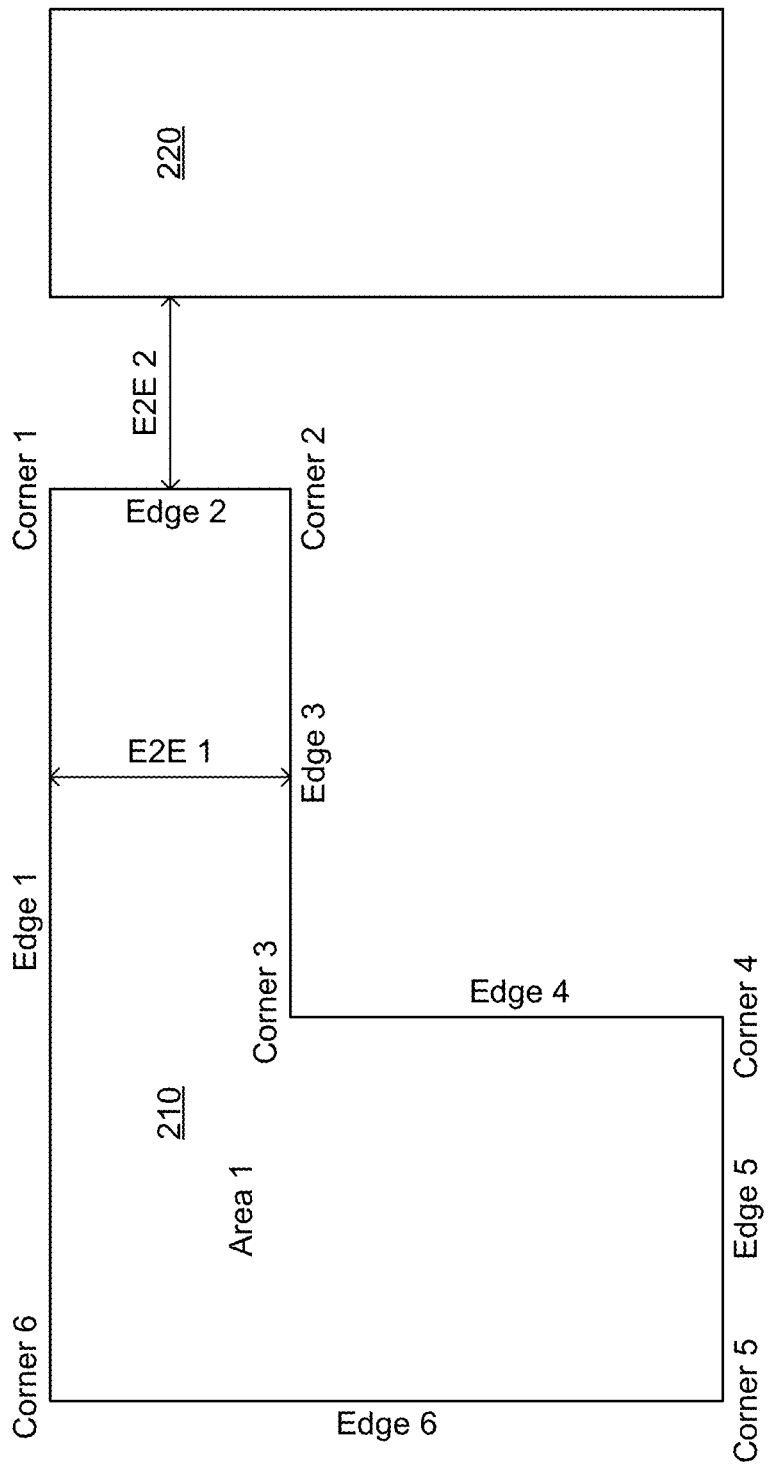
FIG. 2 depicts partitioning a mask layout geometry into feature images.
Figure 3:
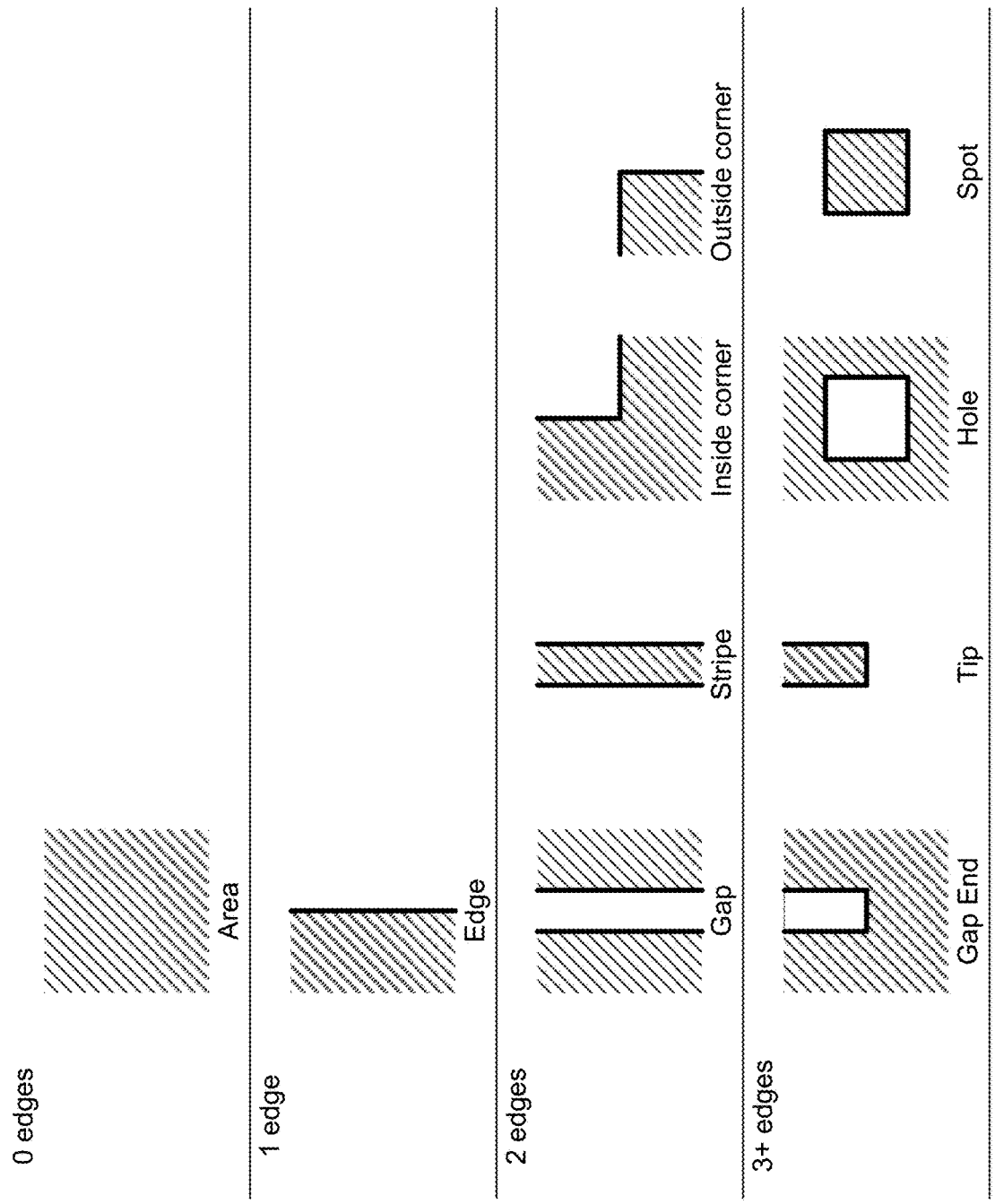
FIG. 3 depicts feature images in a library.

FIGS. 2-4 first describe the use of feature images without mask corner rounding. FIG. 2 depicts partitioning a mask layout geometry into feature images. FIG. 2 shows two shapes 210 and 220 with sharp corners from the layout geometry and the partitioning of shape 210 into features images. Shape 210 is partitioned into the following features images: one Area image, six Edge images, six Corner images, and two Edge-to-Edge (E2E) images. The shape 210 may be partitioned into the feature images based on rules to identify different features present in the mask layout. In this example, the interior area of the polygon shape 210 and its contribution to the mask function is represented by the Area 1 feature image. This defines which areas of the mask are opaque versus transmissive or reflective. The Edge feature images (Edge 1-Edge 6) account for diffraction and scattering of the electromagnetic wave at edges.

The remaining feature images are based on combinations of two edges, where there will be interaction between the two edges. The Corner feature images (Corner 1-Corner 6) account for interactions at corners, which is beyond just the individual contributions of the two edges. Note that in FIG. 2, the Corners include both inside corners and outside corners. The Edge-to-Edge (E2E) feature images account for interactions between parallel edges. E2E 1 accounts for interactions between Edges 1 and 3. E2E 2 accounts for interactions between Edge 2 and the left edge of shape 220.

Each of the feature images is an image. For example, the Area image may be the polygon of shape 210. Each of the Edge images may be a filtered version of the relevant edge. In some cases, rasterization filters are applied to generate the feature images.

The partitioning of the layout geometry uses predefined feature images 125 from library 120. The feature images in the library may be selected based on an understanding of scattering, and what types of geometric features contribute to scattering.

FIG. 3 depicts some examples of feature images in a library. The features images in FIG. 3 are classified according to the number of edges in the feature image. The feature images in the top row have 0 edges, the ones in the next row have 1 edge, and then 2 edges, and then 3+ edges. These are just examples and are not exhaustive.

In the top row, the Area feature image determines which areas of the mask are opaque versus transmissive or reflective. Actual instances of the Area feature images may have different shapes, sizes and locations, depending on the geometric layout of shapes on the mask. The M3D filter corresponding to the Area feature image represents the scattering produced by each point in the area assuming an infinitely large area, i.e., the contribution to the mask function from each point within a bulk area of the geometric layout ignore any edge effects. Hence, the convolution of the M3D filter with an instance of the Area feature image (e.g., Area 1 in FIG. 2) yields the MF contribution from the bulk area of that shape in the mask.

In the second row, the Edge feature image is another important class of feature images, because diffraction or scattering of the electromagnetic wave occurs at edges. FIG. 3 shows one Edge feature image, but the library may have many types of Edge images. For a mask with only Manhattan geometry, four Edge feature images are included in the library, corresponding to the four possible orientations of an edge in the Manhattan geometry. Some masks may also allow edges at multiples of 45 degrees, or even at arbitrary angles. The M3D filter corresponding to the Edge feature image represents the scattering produced by each point along the edge assuming an infinitely long edge.

The third row shows another important class of feature images, which are combinations of two edges. When two edges become close enough, there will be interaction between the two edges. Several examples are shown in FIG. 3. In the first two examples, the two edges are parallel. This is generally referred to as Edge-to-Edge (labelled E2E in FIG. 2). FIG. 3 shows two different polarities, depending on whether the area between the two edges is filled by mask material or not. In addition to the two different polarities, the library may also contain edge-to-edge feature images with different separations between the edges, and with the edges oriented at different angles (horizontal, vertical, at multiples of 45 degrees, etc.).

In the last two examples of third row, the two edges are perpendicular to each other. These are Corner feature images: an inside corner and an outside corner, depending on the polarity. The library may contain Corners oriented at different angles. Other two-edge feature images are also possible. For example, the two edges may be at different angles to each other. The two edges may be separated but not parallel to each other. Thus, the two edges will be slowly converging or diverging. Corners at angles other than 90 degrees are also possible.

The bottom row shows feature images with three or more edges. The first two examples are tips of both polarities. The library may contain versions of different widths and at different angular orientations. The next two examples are holes or vias of both polarities. Different versions may have different widths, heights and angular orientations.

Each of the feature images has a corresponding filter that is used to produce the MF contribution from the feature image. That is, the scattering effects of the feature image are captured by the M3D filter. In one approach, rigorous simulations are performed for the feature images and the rigorous results are used to determine the M3D filters.

The M3D filters may be calculated by starting with lower order effects. The effect of an Area image (0-order feature image) depends only on the transmission or reflection of the area in question. In a rigorous simulation, the mask structure for this feature image is a plane of constant value. The M3D filter is a constant equal to the transmission or reflection computed from the rigorous simulation.

Next consider an Edge feature image. An edge in the layout geometry is partitioned into an Area feature image plus an Edge feature image. The rigorous simulation of edge scattering is then modeled by the MF contribution from the Area feature image plus the MF contribution from the Edge feature image. The MF contribution from the Area feature image is already determined, so the mask function contribution from the Edge feature image and the corresponding M3D filter may then be determined.

Figure 4A:
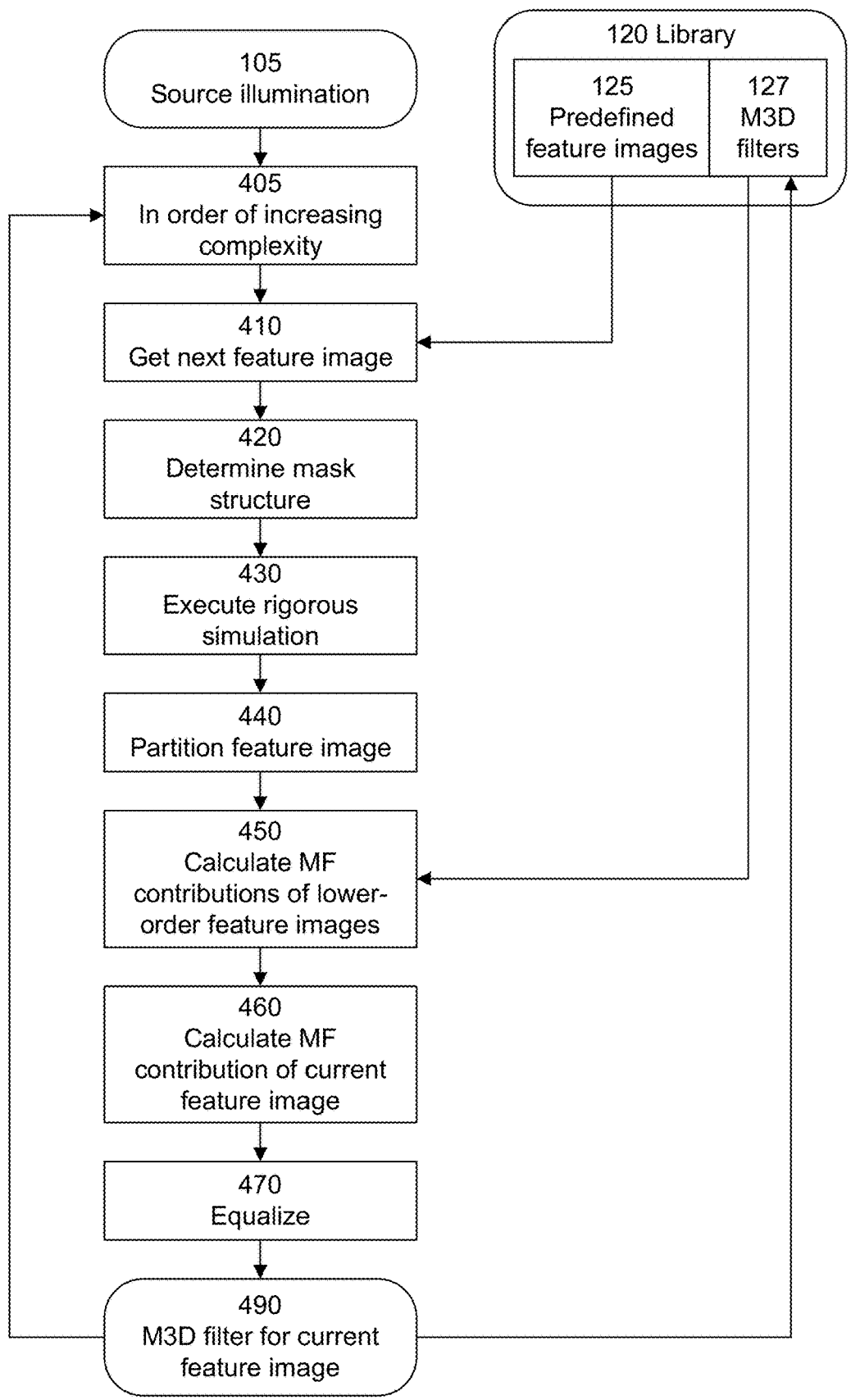
FIG. 4A is a flowchart for calculating a M3D filter for a feature image.
Figure 4B:
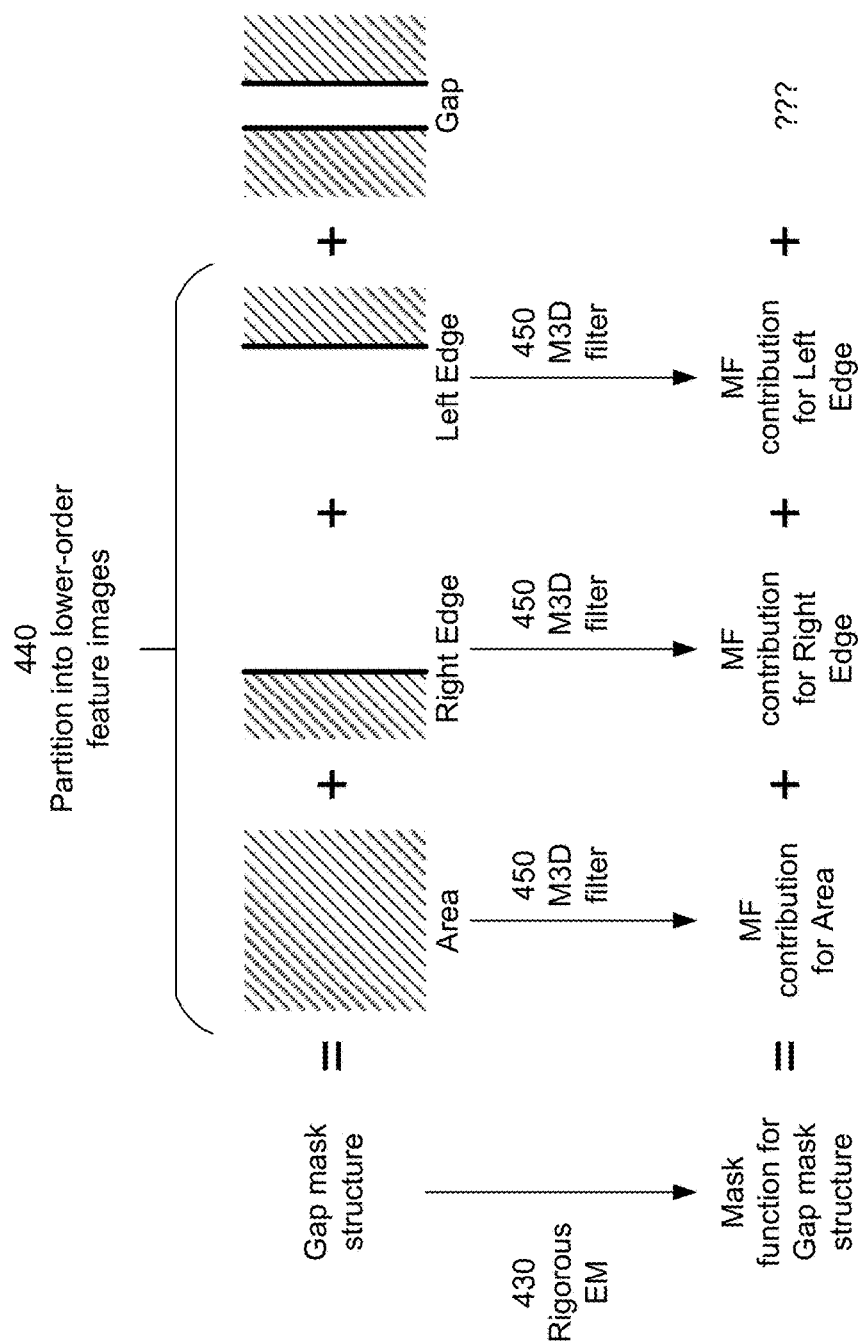
FIG. 4B depicts an example M3D filter calculation.

After all single-edge feature images are considered, then consider feature images that consist of two edges. FIG. 4A is a flowchart for calculating M3D filters for feature images, progressing from lower-order to higher-order feature images. FIG. 4B depicts an example M3D filter calculation for the two-edge Gap feature image shown in FIG. 3.

In the example of FIG. 4B, the M3D filters for 0-edge and 1-edge feature images have already been calculated and the process moves 405 to more complex feature images: two-edge feature images. The Gap feature image have a specific spacing $\Delta$ is considered next 410. The mask structure for the Gap feature image is determined 420 to be two edges separated by a spacing $\Delta$. Rigorous three-dimensional simulation may be executed 430 for this mask structure, yielding the mask function for this mask structure.

The geometric layout for this mask structure is also partitioned 440 into lower-order feature images: an Area feature image+two Edge features images+the Gap feature image of interest. This is shown pictorially in the top row of FIG. 4B. The aggregate mask function calculated by rigorous electromagnetic simulation equals the sum of the MF contributions from each feature image:

$$MF = \Sum_{i=1}^{N} I_i \otimes K_i \qquad (1)$$

where $I_i$ are the feature images, $K_i$ are the corresponding M3D filters, $\otimes$ is the convolution operator, and N is the number of feature images. MF is the mask function, which in this case is known from the rigorous simulation. The MF contributions for the lower-order feature images may be calculated 450 using the previously calculated M3D filters for those images. This leaves one unknown in Eqn. 1, shown pictorially at the bottom of FIG. 4B. That is the M3D filter for the Gap feature image, which may then be calculated 460. In some cases, this may be used as the M3D filter 127 in the library 120.

The feature images may be grayscale representations of features, which allow sparse sampling of the images. For example, an edge has infinite frequency components and would require infinite bandwidth to represent with 100% fidelity. However, it may instead be represented by a low-pass filtered version of the edge, which is like a grayscale blurry edge. Polygon shapes in the mask may be rasterized using a low-pass rasterization function. This removes high frequency components of the feature, retaining only the low frequency components. This is acceptable because the projection optics is actually a low pass system, so it will naturally filter out the high (spatial) frequency components. To make it more compact and therefore faster in rasterization operations, the low-pass rasterization filter is designed to have a non-uniform response in the frequency passband as compared to the uniform response of a sinc or sinc-like function. To the extent that the low-pass rasterization function has a non-uniform response in its frequency passband, an equalizing filter 470 may be added to compensate for the non-uniform response. The M3D filter 490 is then a combination of the electromagnetic scattering and the equalization.

The approach described above may be repeated for Gap feature images with different spacings Δ, for example in increments of 1 nm. It may also be repeated for different orientations and polarities. It may also be repeated for other 2-edge and more complex feature images.

Eqn. 1 may be calculated and solved in the spatial domain using direct convolutions. However, it may also be processed in the spatial frequency domain. The quantities are converted to the spatial frequency domain, and the convolution becomes a product. The equivalent equation is then $$FT\{MF\}=\Sigma_{i=1}^{N}FT\{I_i\}FT\{K_i\} \quad (2)$$

where FT{ } is the Fourier transform.

Now consider the effects of mask corner rounding. FIGS. 5A-5C illustrates an example of MCR correction. The particular mask structure in FIG. 5A is a square 510 with rounded corners 512, where the mask is reflective or transmissive inside the square and absorptive or otherwise blocking outside the square. The rounded corners have a radius of 10 nm in this example. Ignoring the rounded corners, the mask structure would be a square with sharp corners, as shown by the dashed lines 514. This shape may be partitioned into an Area feature image, four Edge feature images, and four Corner feature images. All of these feature images are polygon-based feature images that assume sharp corners rather than rounded corners. To account for the rounded corners, MCR correction images are applied to the polygon-based feature images, to yield MCR-corrected feature images. The MCR-corrected feature images also include one Area feature image, four Edge feature images, and four Corner feature images, but all corrected for mask corner rounding.

FIG. 5B shows an MCR correction image applied to the Area feature image. The dashed lines show the location of lower left corner 516A from FIG. 5A. FIG. 5B shows a 300 nm×300 nm portion of the MCR correction image that accounts for effects from corner rounding of the lower left corner. The origin (0,0) is the location of the corner. This correction image accounts for effects from the lower left corner. The color coding shows the amplitude of the MCR correction image, ranging from red which is the most positive to dark blue which is the most negative. This is the MCR correction image for just the lower left corner. Rotated or flipped versions of this correction image form the MCR correction images for the other three corners. For example, FIG. 5C shows a flipped version of FIG. 5B which is the MCR correction image for the upper left corner 516B. The position of upper left corner 516B is shown by dashed lines in FIG. 5C.

The polygon-based Area feature image before low-pass filtering is the square 514 with sharp corners, where the interior of the square is a constant amplitude. Low-pass filtering introduces ripples near the boundaries. The MCR corrections for the four corners are added to the polygon-based Area feature image to produce the MCR-corrected Area feature image. Note that the MCR correction does not just cut off the sharp corners and the MCR-corrected Area feature image is not a square with rounded corners where the interior of the rounded square is a constant amplitude. In addition, note that the corrections extend beyond the square 514 itself. This is caused in part by low-pass filtering which removes high-frequency content in the feature image.

The MCR correction image depends on the curvature of the corner. The radius of the corners is one measure of their curvature. For the Area feature image, a lookup table of MCR correction images may include versions of FIG. 5B for corners of different curvature.

Figure 5E:
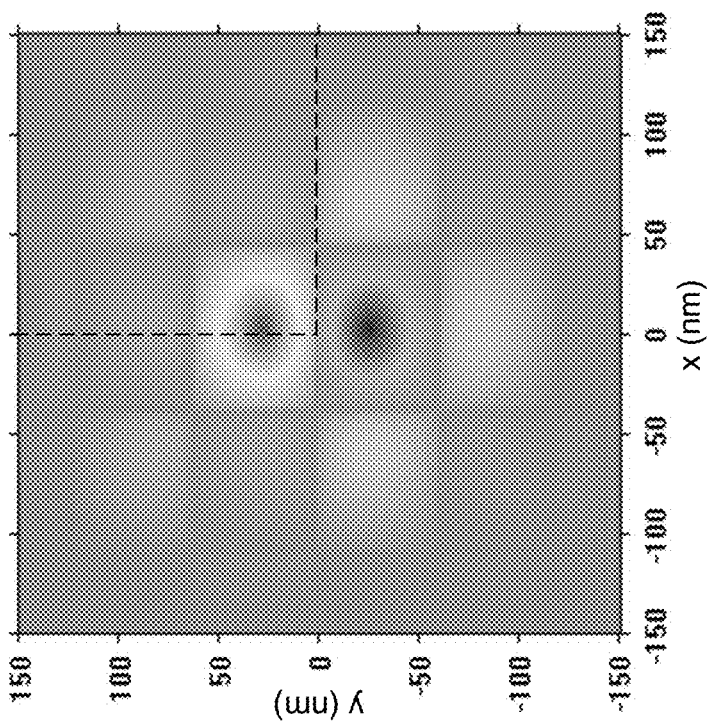
FIGS. 5D and 5E depict additional mask corner rounding (MCR) correction images for the mask structure of FIG. 5A.
Figure 5D:
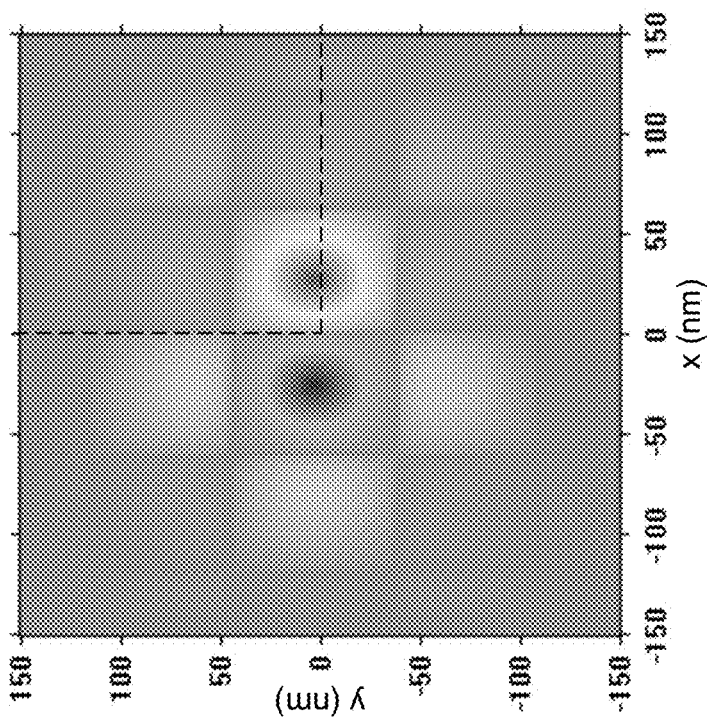

FIG. 5D shows an MCR correction image applied to a polygon-based Left Edge feature image. The dashed lines show the location of lower left corner 516A from FIG. 5A. FIG. 5D shows a 300 nm×300 nm portion of the MCR correction image that accounts for effects from corner rounding of lower left corner. The color coding shows the amplitude of the MCR correction image, ranging from deep red to deep blue. Rotated or flipped versions of this correction image form the MCR correction images for other corners and for other Edge feature images. For example, FIG. 5E shows the MCR correction image for the lower left corner (same as FIG. 5D), but for the Bottom feature image. MCR correction images for the applicable corners are applied to the Edge feature images. Corrections for the lower left and upper left corners are applied to the Left Edge feature image, corrections for the lower left and lower right corners are applied to the Bottom Edge feature image, etc.

Analogous corrections are also applied to the Corner feature images. The MCR-corrected feature images are convolved with the corresponding M3D filters, which are not changed, to produce the final mask function for the mask structure.

The MCR correction images may be calculated using a process analogous to that shown in FIG. 4. A rigorous simulation is computed for (a) the layout without corner rounding and (b) the layout with corner rounding. The MCR correction images are the calculated to account for the difference between (a) and (b).

Figure 6:
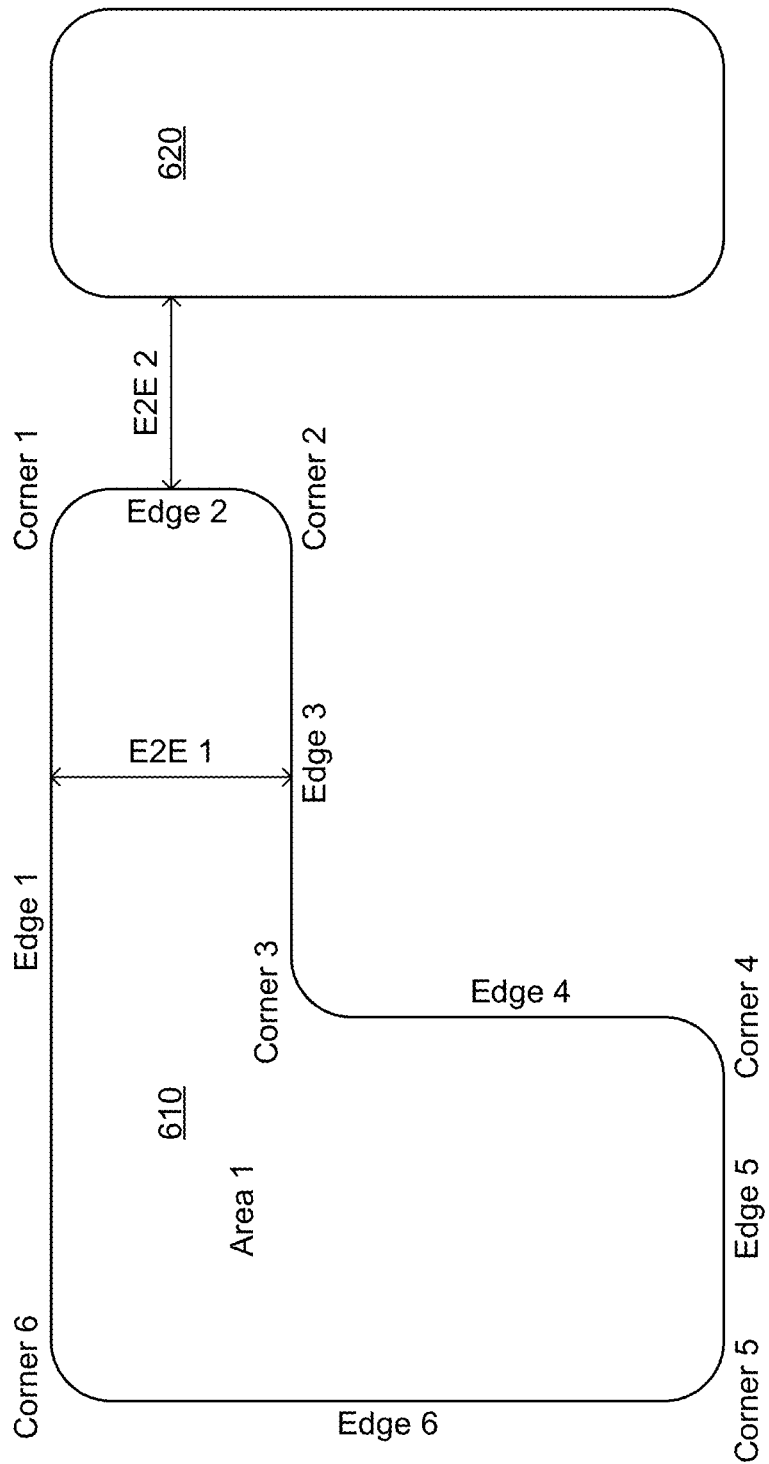
FIG. 6 depicts partitioning a mask layout geometry with rounded corners into MCR-corrected feature images.

FIG. 6 shows the same mask layout geometry as FIG. 2, but with rounded corners. FIG. 6 shows two shapes 610 and 620 with rounded corners. Shape 610 is partitioned into the same features images as in FIG. 2: one Area image, six Edge images, six Corner images, and two Edge-to-Edge (E2E) images. These may initially be the same polygon-based feature images as in FIG. 2, which are then corrected for the rounded corners, yielding MCR-corrected feature images. For example, the Area1 feature image is corrected by MCR correction images for Corners 1-6, the Edge1 feature image is corrected by MCR correction images for Corners 1 and 6, etc.

Figure 7:
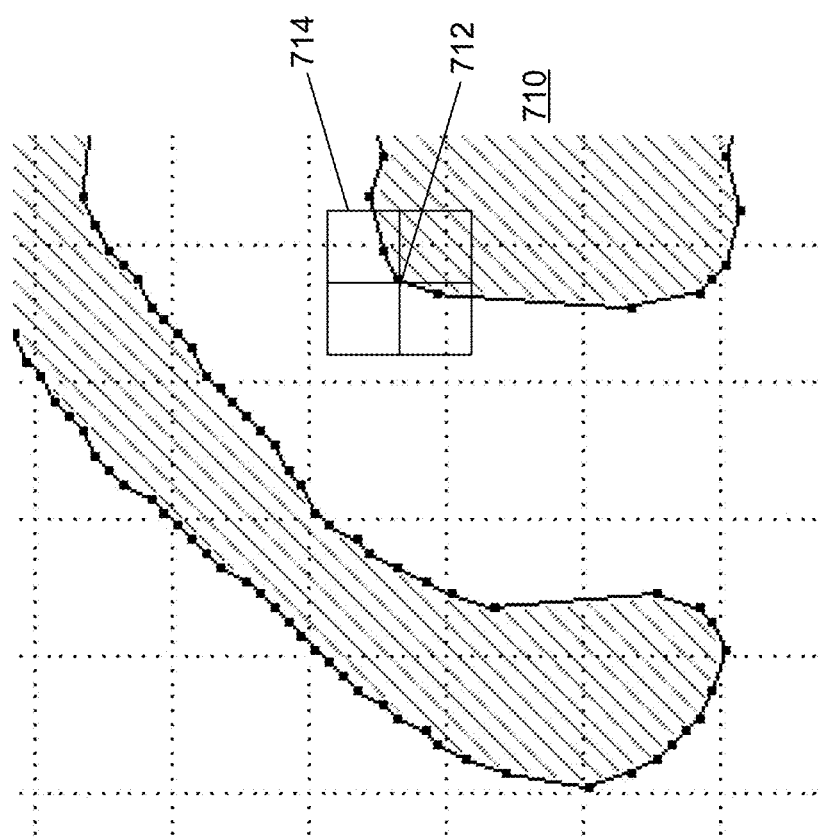
FIG. 7 depicts a mask layout geometry with curved borders.

FIG. 7 depicts the extension of MCR correction to more arbitrarily curved shapes. FIG. 7 shows two shapes that have curved shapes represented by a polygon with many vertices. Consider shape 710. The area around vertex 712 may be represented by a generalization of a rounded corner. In one approach, an ambit window 714 is centered on the vertex 712. The ambit window 714 is comparable in size to the corner rounding radius (e.g., 10 nm in the example of FIG. 5).

The "corner-ish"ness of that section may be parameterized by a parameter S that is based on the polygon edges exiting the ambit window 714. The parameter S may range from −1 to +1, where S=−1 corresponds to a sharp outer corner, S=0 corresponds to a straight line (no corner), and S=+1 corresponds to a sharp inner corner. The curvature of the corner may be estimated based on the path of the edge through the ambit window 714. A weighting factor W may then be calculated as a function of S, where W also ranges from −1 to +1. In some cases, W=0 if |S| is below a threshold. This effectively removes corner rounding, for example to save computation time. The MCR-corrected feature image may then be calculated as polygon-based feature image+(W*MCR correction image). This assumes that the correction for inner and outer corners are equal in magnitude but opposite in sign. Alternatively, two different MCR correction images may be used, depending on whether the corner is an inner corner or an outer corner.

Figure 8:
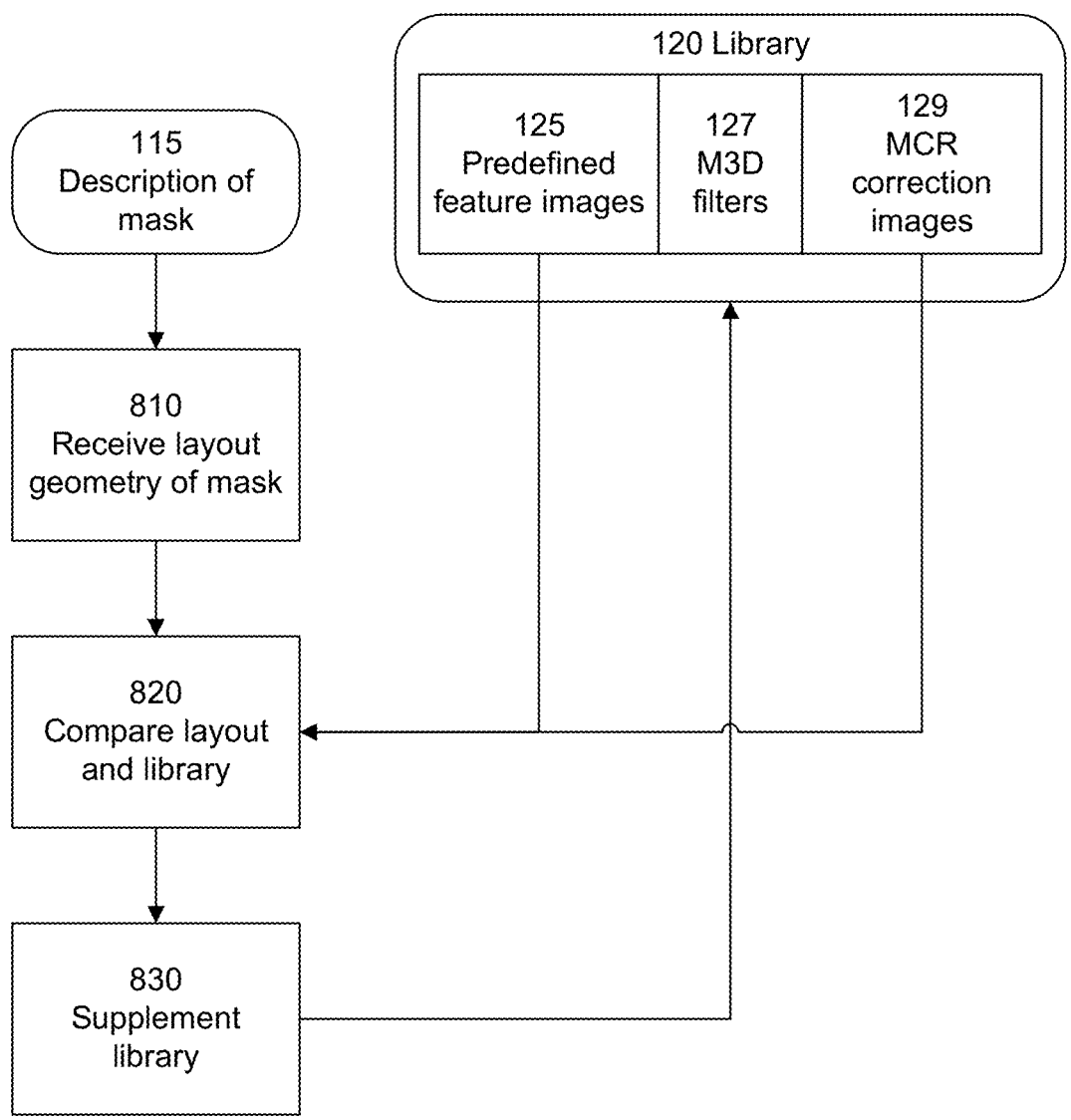
FIG. 8 is a flowchart for developing a library of feature images.

In some cases, the feature images included in the library depend on the layout geometry of the mask. FIG. 8 is a flowchart for developing a library of feature images. The library 120 may begin with a base set of common feature images and MCR correction images, which are then supplemented based on which shapes are present in the layout geometry of the lithographic mask. In FIG. 8, the mask layout is received 810. The layout geometry is compared 820 to the feature images and MCR correction images already in the library. If the library is inadequate, for example if certain features appear in the mask but without the corresponding feature images or MCR correction images in the library, the library may be supplemented 830 with additional feature images and MCR correction images. The M3D filters for these feature images may be calculated as described above.

In addition to making calculations in either the spatial domain (Eqn. 1 above) or the spatial frequency domain (Eqn. 2 above), calculations may also be performed either in parallel or sequentially. In a fully parallel approach, all feature images are convolved with the corresponding M3D filters in parallel. The results are then summed.

Various embodiments of the approach described herein may also have the following features and benefits. It can be implementation friendly for both machine learning (ML) and non-ML frameworks as well as for graphics processing units (GPUs). As shown above, the model formation is based on convolutions between feature images and M3D filters, which is compatible with popular ML frameworks (e.g., TensorFlow) and GPUs. Therefore, it can be directly implemented in these frameworks to take advantage of the capabilities (e.g., optimization engine, hardware acceleration, etc.) offered by these ML frameworks for lithography applications (e.g., lithography model calibration/fine-tuning, mask layout optimization, illumination source optimization, etc.).

It can also be data efficient for model creation, training and calibration. A conventional ML-based M3D model relies on the machine to generate feature images and filters by learning from data, which is highly empirical and generally requires a massive amount of data in order to avoid overfitting and ensure prediction stability. It is computationally expensive and time consuming to generate the required amount of data. In the approach described here, the feature images and M3D filters are generated based on physical insight, which is more stable and requires significantly less data.

It can improve runtime. The feature images generation involves rasterizing mask polygons into greyscale images. Conventionally, the mask polygons are rasterized into thin-mask transmission functions, which is computationally inefficient as a sinc (or sinc-like) rasterization function must be used for thin-mask transmission function calculations in order to ensure a uniform frequency response in the passband. In the approach described herein, a special rasterization function may be designed which is more compact than the sinc (or sinc-like) function and therefore is computationally more efficient. This new rasterization function does not need to have a uniform frequency response in the passband. The M3D filters are modified (step 470 in FIG. 4A) to restore the required frequency response in the convolutions between the feature images and the modified M3D filters.

It can be computationally efficient for both Hopkins and Abbe imaging models. While only one MF is required in Hopkins imaging simulation, multiple MFs (one per incident field angle) are required in Abbe imaging simulation, which significantly increases the runtime as the MF is calculated multiple times if the conventional Abbe-based approach is used. In the approach described here, the feature images may be independent of the incident field angle and therefore only need to be computed once. Although multiple sets of M3D filters and convolutions (one per incident field angle) are used, the filters can be pre-computed and the convolutions can be done efficiently using FFT methods.

These increases in computational efficiency and runtime can make it feasible to simulate the entire mask layout of a chip in a reasonable amount of time.

Figure 9:
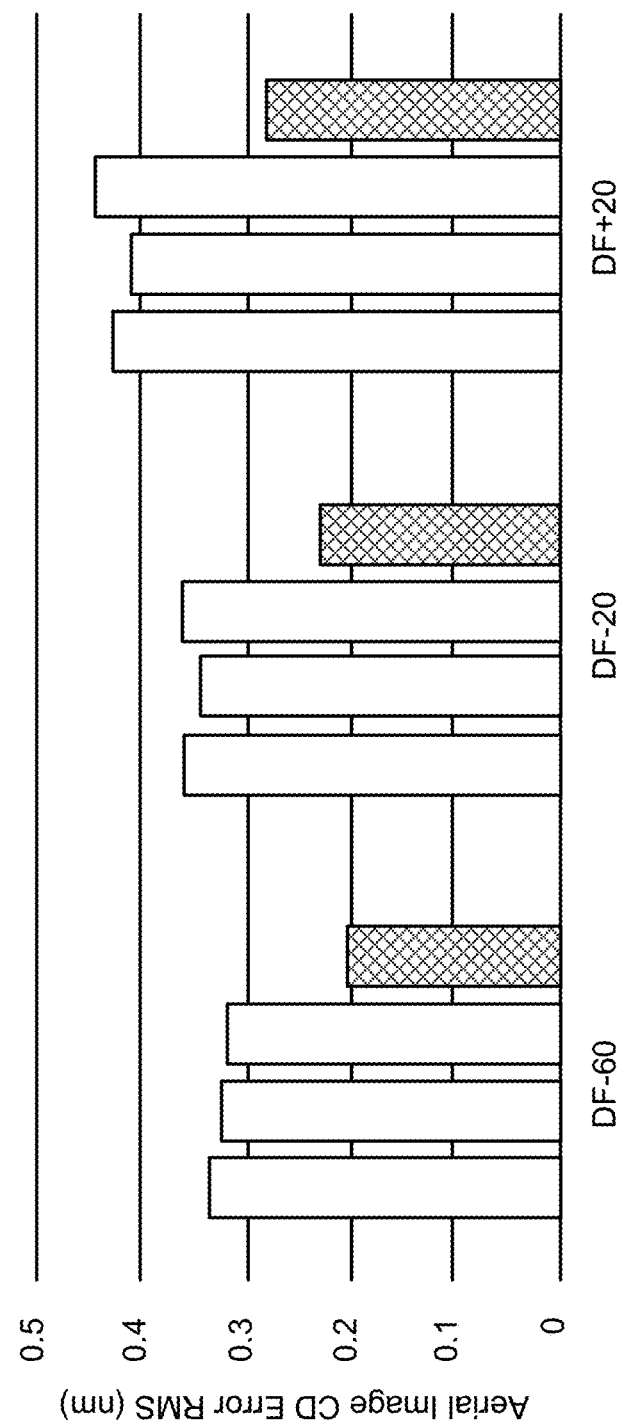
FIG. 9 illustrate results comparing the approach using feature images to other approaches.

FIGS. 9-10 illustrate simulations using feature images. FIG. 9 illustrate results comparing the approach using feature images to other approaches. These experiments simulate an EUV mask with different types of patterns on the mask, but without corner rounding. FIG. 9 shows the root-mean-square of the CD (critical dimension) error in the aerial image predicted using this approach versus three other approaches. In FIG. 9, the cross-hatched bar is the approach described herein using feature images, and the white bars are the other approaches. The left group of four bars is at a defocus of −60 nm, the center group is at defocus of −20 nm, and the right group is at defocus of +20 nm. In all cases, the approach using feature images has lower RMS error.

Figure 10A:
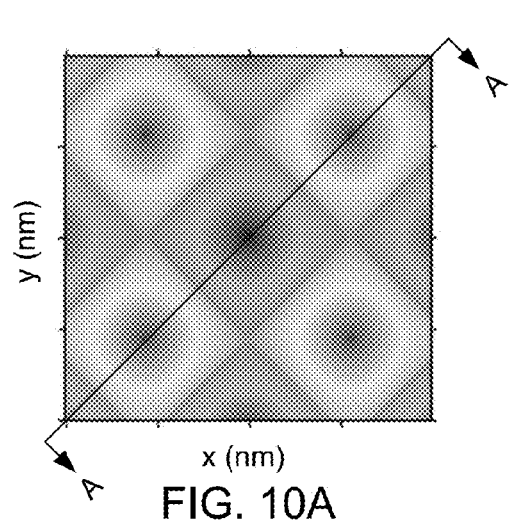
FIGS. 10A-10C illustrate the effects of MCR correction on Mask3D aerial images calculated from the predicted mask 3D field.
Figure 10B:
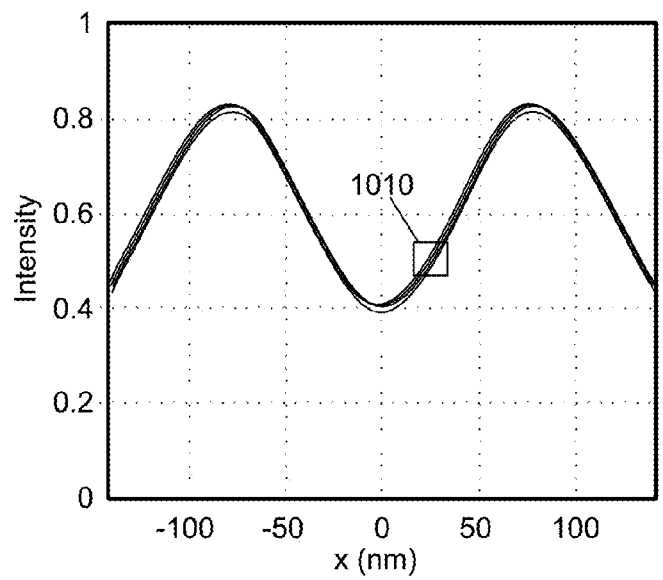
Figure 10C:
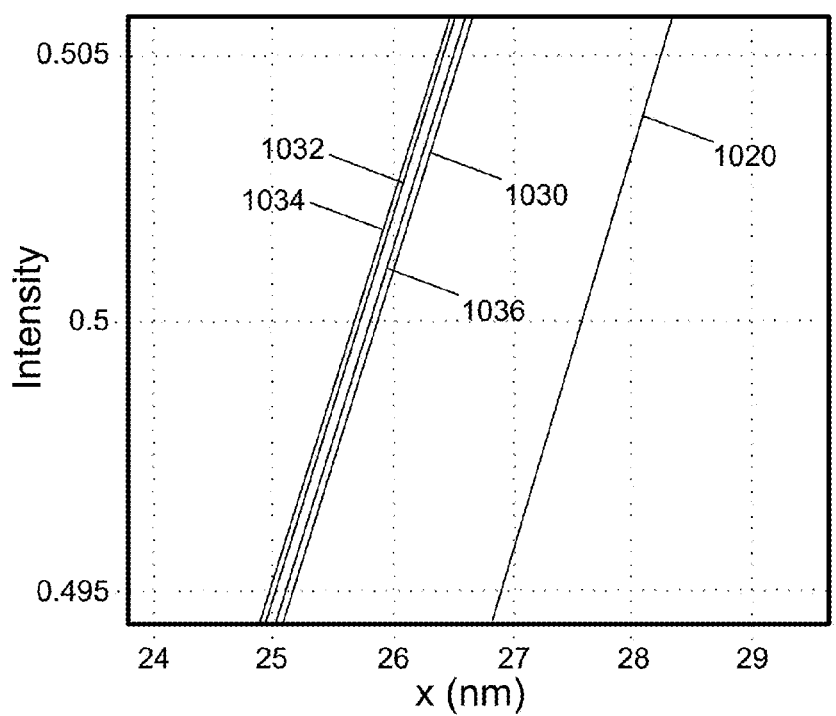

FIGS. 10A-10C illustrate the effects of MCR correction on Mask3D aerial images calculated from the predicted mask 3D field. The mask layout in this example is a dense array of square contacts with rounded corners. The mask structure for a single square contact is similar to the structure shown in FIG. 5A. The square structure has a width of 42 nm and corner rounding with radius of 10 nm. The pitch of the array is 112 nm. The resulting aerial image produced by this mask is shown in FIG. 10A, where the red color is highest intensity and the blue color is lowest intensity. FIG. 10B shows a plot along a 45-degree slice A-A through the aerial image. FIG. 10B shows multiple plots, corresponding to different methods for calculating the aerial image. FIG. 10C shows an enlarged view of box 1010 in FIG. 10B. In the enlarged view, plot 1020 is without corner rounding. That is, the squares are simulated as squares with sharp corners. The other four plots are for corner rounding with corner radius of 10 nm, but using different simulation approaches. Plot 1030 uses a curvilinear geometry-based MCR model. That is, the rounded corner is modeled as a curve. This plot 1030 is considered to be the ground truth. Plot 1032 uses a Manhattanized curvilinear geometry-based MCR model. That is, the rounded corner is modeled as a staircase using Manhattan geometry. This can be computationally expensive, since the staircase contains a large number of very short segments and close corners. Plot 1034 uses the MCR correction images described above, but with Area correction only. It is almost as accurate as the Manhattan geometry based approach, but computationally less expensive to compute. Plot 1036 uses MCR corrections image, but with both Area and Edge corrections. It is the most accurate of the approaches, while still computationally less expensive than the Manhattan geometry based approach.

Figure 11:
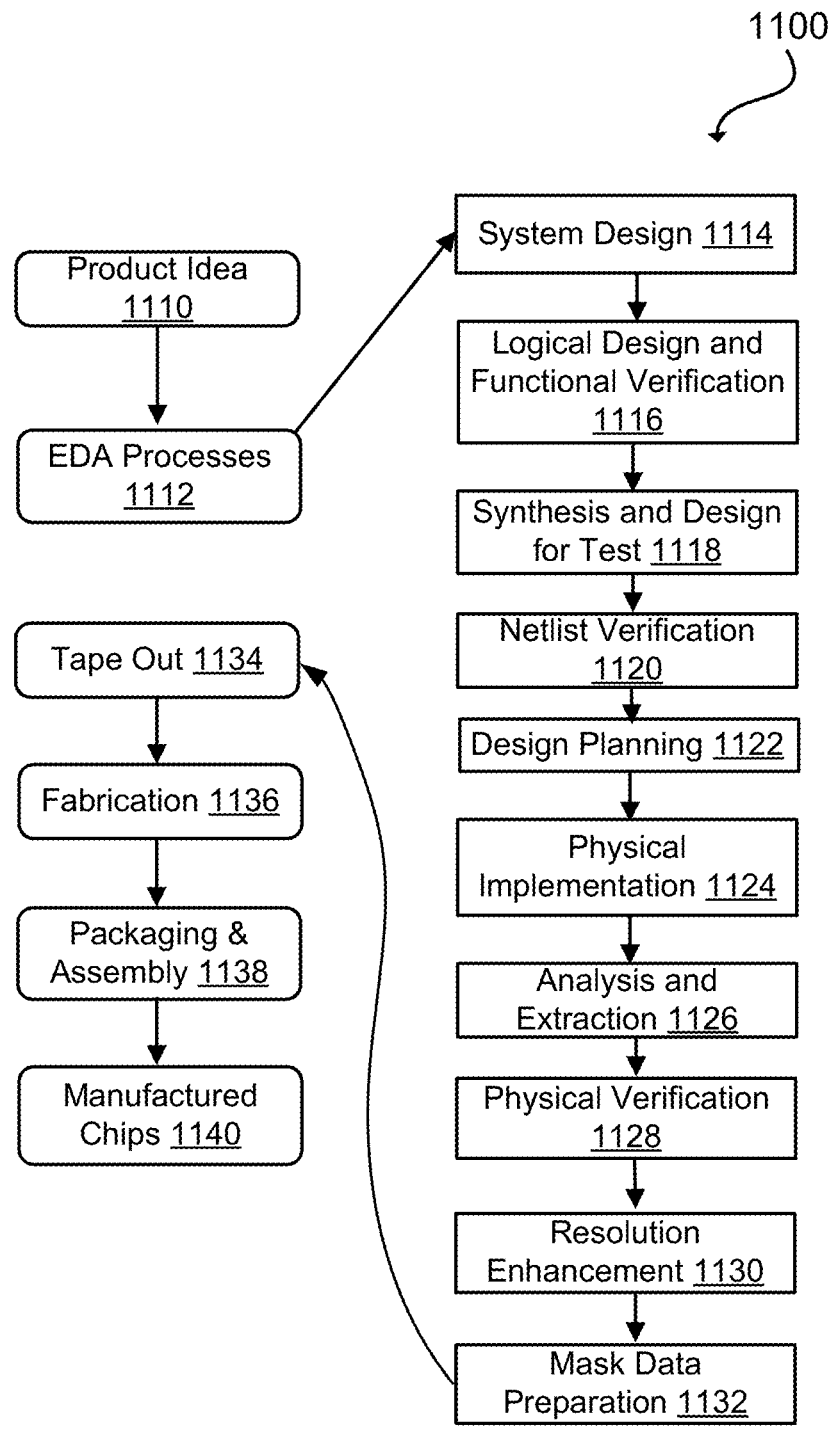
FIG. 11 is a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 11. The processes described by be enabled by EDA products (or EDA systems).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12) may be used to store the programs and data structures that are used by some or all of the EDA products described herein, and products used for development of cells for the library and for physical and logical design that use the library.

Figure 12:
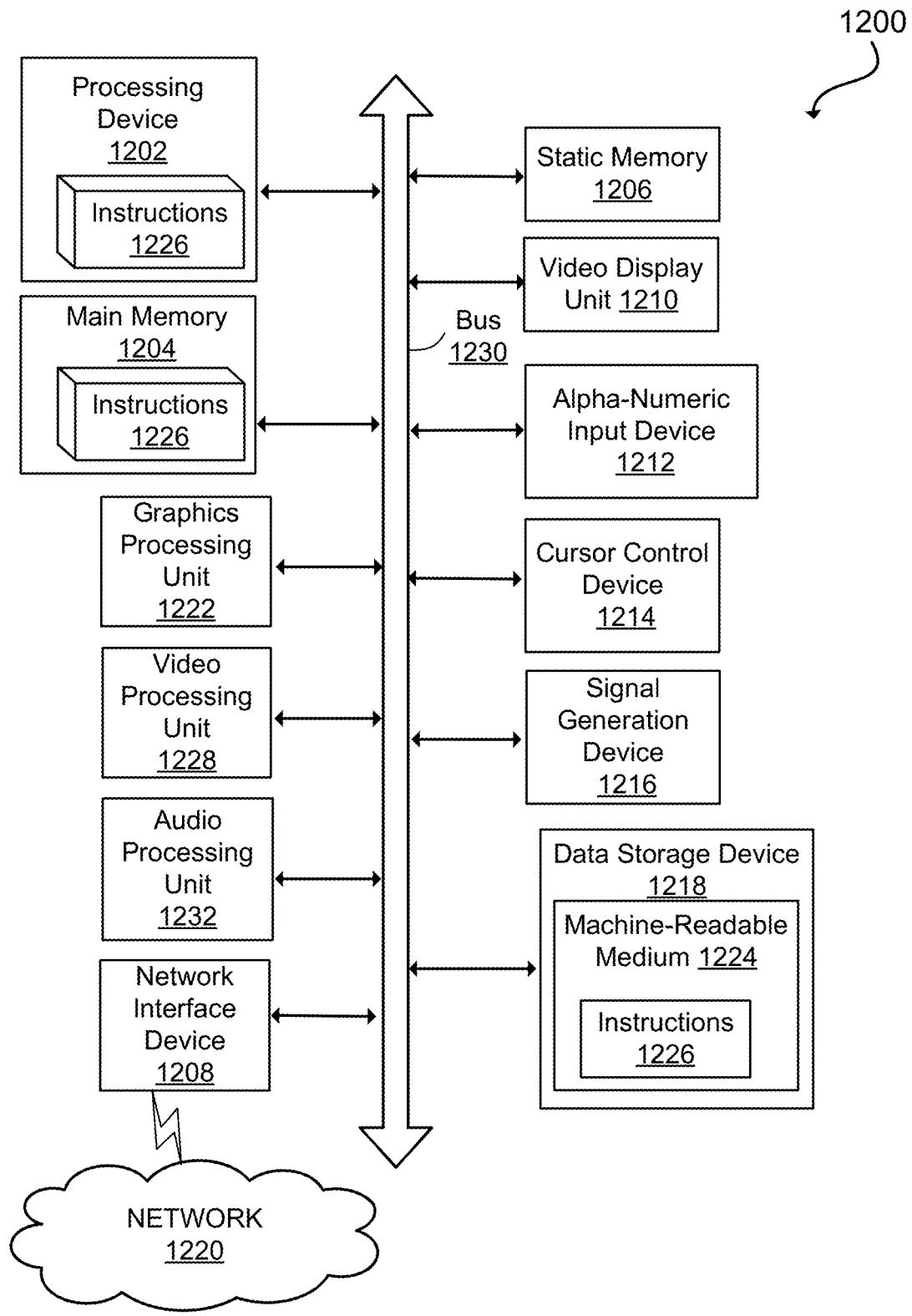
FIG. 12 depicts a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method comprising:
 receiving a layout geometry of a lithographic mask, the layout geometry including at least one shape having one or more rounded corners;
 partitioning, by one or more processors, the layout geometry into a plurality of feature images; wherein the feature images comprise at least one mask corner rounding (MCR)-corrected feature image that accounts for the rounded corners of the shape, and the MCR-corrected feature image is a sum of a polygon-based feature image for the shape plus an image that accounts for the rounded corners of the shape;
 calculating a mask function (MF) contribution from each of the plurality of feature images by convolving the feature image with a corresponding mask 3D (M3D) filter; wherein the M3D filter corresponding to each feature image represents an electromagnetic scattering effect of that feature image, and the M3D filter for the MCR-corrected feature image is the same as an M3D filter for the corresponding polygon-based feature image; and
 determining a mask function for the lithographic mask based on a combination of the calculated MF contributions.

2. The method of claim 1 wherein a correction for the at least one polygon-based feature image is parameterized by an angle of the rounded corners and a curvature of the rounded corners.

3. The method of claim 1 wherein a correction for the at least one polygon-based feature images is determined by a rigorous electromagnetic simulation of the scattering effects of mask structures based on the feature image with rounded corners illuminated by a source illumination.

4. The method of claim 1 wherein partitioning the layout geometry into a plurality of feature images comprises:
 partitioning the layout geometry into a plurality of polygon-based feature images; and
 for at least one shape with rounded corners, correcting all of the polygon-based feature images for that shape to produce MCR-corrected feature images for that shape.

5. The method of claim 4 wherein the feature images for that shape consist of an area image, one or more single-edge images, and multiple multi-edge images.

6. The method of claim 1 further comprising:
 applying the mask function as input to an Abbe imaging model or Hopkins imaging model.

7. The method of claim 1 wherein the layout geometry comprises a layout geometry for an entire chip.

8. The method of claim 1 wherein a source illumination of the lithographic mask is an extreme ultraviolet (EUV) or deep ultraviolet (DUV) illumination.

9. A system comprising:
 a computer readable storage medium storing instructions and a library containing predefined feature images and corresponding precalculated mask 3D (M3D) filters; and
 a processor device, coupled with the computer readable storage medium and to execute the instructions, the instructions when executed cause the processor device to:
  partition shapes of a layout geometry of a lithographic mask into a plurality of feature images based on the predefined feature images contained in the library, the plurality of feature images including at least one MCR-corrected feature image, wherein the MCR-corrected feature image is a sum of a polygon-based feature image for the shape plus an image that accounts for rounded corners of the shape;
  calculate mask function (MF) contributions from each of the plurality of feature images by convolving the feature image with the corresponding M3D filter from the library, wherein the M3D filter for the MCR-corrected feature image is the same as an M3D filter for the corresponding polygon-based feature image; and
  combine the calculated MF contributions to determine a mask function for the lithographic mask.

10. The system of claim 9 wherein the feature images are contained in one or more lookup tables, and partitioning the layout geometry and calculating the MF contributions comprises:
 selecting feature images and corresponding M3D filters from the lookup tables.

11. The system of claim 9 wherein the predefined feature images in the library comprise feature images that account for rounded inner corners, rounded outer corners, different angles of rounded corners, and different curvatures of the rounded corners.

12. The system of claim 9 wherein the predefined feature images in the library comprise an area image, one or more single-edge images, and multiple multi-edge images that are based on sharp corners; and an area image, one or more single-edge images, and multiple multi-edge images that account for rounded corners.

13. A non-transitory computer readable medium comprising stored instructions, which when executed by a processor device, cause the processor device to:
 receive a layout geometry of a lithographic mask, the layout geometry including at least one shape having one or more rounded corners;
 partition the layout geometry into a plurality of feature images, wherein the plurality of feature images comprise at least one feature image that accounts for the rounded corners of the shape, and the MCR-corrected feature image is a sum of a polygon-based feature image for the shape plus an image that accounts for the rounded corners of the shape;

calculate a mask function (MF) contribution from each of the plurality of feature images by convolving the feature image with a corresponding mask 3D (M3D) filter, wherein the M3D filter corresponding to each feature image represents an electromagnetic scattering effect of that feature image, and the M3D filter for the MCR-corrected feature image is the same as an M3D filter for the corresponding polygon-based feature image; and determine a mask function for the lithographic mask based on a combination of the calculated MF contributions.

14. The computer readable medium of claim 13 wherein partitioning the layout geometry and calculating the mask function (MF) contribution are based on a library of pre-defined feature images and corresponding precalculated mask 3D (M3D) filters.

15. The computer readable medium of claim 13 wherein the plurality of feature images comprise an area image, one or more single-edge images, and multiple multi-edge images.

* * * * *